United States Patent
Klobucar et al.

(10) Patent No.: US 8,241,032 B2
(45) Date of Patent: Aug. 14, 2012

(54) SINGLE LEVEL MANIFOLD FOR AN INJECTION MOLDING APPARATUS

(75) Inventors: Peter Klobucar, Georgetown (CA); Neil Dewar, Georgetown (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 63 days.

(21) Appl. No.: 12/781,978

(22) Filed: May 18, 2010

(65) Prior Publication Data

US 2011/0287129 A1  Nov. 24, 2011

(51) Int. Cl.
*B29C 45/22* (2006.01)

(52) U.S. Cl. .................................. 425/570; 425/572

(58) Field of Classification Search ............ 425/570, 425/572
See application file for complete search history.

(56) References Cited

U.S. PATENT DOCUMENTS

| | | | |
|---|---|---|---|
| 3,470,914 | A | 10/1969 | Smith |
| 3,533,594 | A | 10/1970 | Segmuller |
| 3,936,262 | A | 2/1976 | Hehl |
| 3,940,224 | A | 2/1976 | Armour |
| 4,256,140 | A | 3/1981 | Swaroop et al. |
| 5,683,731 | A | 11/1997 | Deardurff et al. |
| 5,762,976 | A | 6/1998 | Brown |
| 6,077,470 | A | 6/2000 | Beaumont |
| 6,235,230 | B1 | 5/2001 | Puniello |
| 6,382,528 | B1 | 5/2002 | Bouti |
| 6,450,798 | B1 | 9/2002 | Choi et al. |
| 6,503,438 | B2 | 1/2003 | Beaumont et al. |
| 6,544,028 | B2 | 4/2003 | Wright et al. |
| 6,572,361 | B2 | 6/2003 | Gould et al. |
| 7,287,977 | B2 | 10/2007 | Serniuck et al. |
| 7,320,589 | B2 | 1/2008 | Babin et al. |
| 7,465,165 | B2 * | 12/2008 | Fischer et al. ............... 425/572 |
| 2004/0119200 | A1 | 6/2004 | Gram |
| 2004/0265422 | A1 | 12/2004 | Sabin et al. |
| 2006/0054222 | A1 | 3/2006 | Goinski |
| 2006/0261521 | A1 | 11/2006 | Beaumont |
| 2007/0296100 | A1 | 12/2007 | Beaumont |

(Continued)

FOREIGN PATENT DOCUMENTS

DE   2114465 A1   10/1972

(Continued)

OTHER PUBLICATIONS

Donald V. Rosato and Dominick V. Rosato, Injection Molding Handbook, 1995, Chapman & Hill, 2nd Edition, pp. 672 and 673.*

(Continued)

*Primary Examiner* — Tim Heitbrink
(74) *Attorney, Agent, or Firm* — Medler Ferro PLLC

(57) ABSTRACT

An injection molding apparatus is disclosed having a single level manifold that utilizes a melt splitter. The manifold defines an inlet and a plurality of outlets with at least one upstream melt channel and a plurality of downstream melt channels that are situated between the inlet and the plurality of outlets. The upstream melt channel branches into the plurality of downstream melt channels with the upstream melt channel and each of the downstream melt channels longitudinally extending in the same plane. The melt splitter is at least partially positioned within the upstream melt channel where the upstream melt channel intersects with the plurality of downstream melt channels. The melt splitter divides a melt flow received from the upstream melt channel into substantially equal volumes and then directs each of the substantially equal volumes into a respective one of the plurality of downstream melt channels.

20 Claims, 14 Drawing Sheets

U.S. PATENT DOCUMENTS

| | | |
|---|---|---|
| 2008/0296805 A1 | 12/2008 | Brand et al. |
| 2009/0047373 A1 | 2/2009 | Galt et al. |
| 2009/0047376 A1 | 2/2009 | Galt et al. |
| 2009/0136614 A1 | 5/2009 | Carlton et al. |

FOREIGN PATENT DOCUMENTS

| | | |
|---|---|---|
| DE | 102009014113 | 9/2010 |
| EP | 293756 A2 | 12/1988 |
| EP | 293756 A3 | 12/1988 |
| FR | 1330440 A | 6/1963 |
| JP | 55-9849 | 1/1980 |
| JP | 60-15113 | 1/1985 |
| JP | 63-239022 A | 10/1988 |
| JP | 6-262650 A | 9/1994 |
| JP | 8-90601 | 4/1996 |
| KR | 10-0754803 B | 9/2007 |
| KR | 10-0798373 B | 1/2008 |
| KR | 2008/013540 A | 2/2008 |
| WO | WO-2008/061585 A1 | 5/2008 |
| WO | WO-2009/026667 A1 | 3/2009 |

OTHER PUBLICATIONS

Mold Masters pamphlet entitled Your connection! . . . To Injection Molding Excellence: Modular Manifolds, 1986.*

Blundy, John , "Improving Shear Induced Imbalance in Hot Runner Systems",INCOE Corporation, Jun. 2004.

* cited by examiner

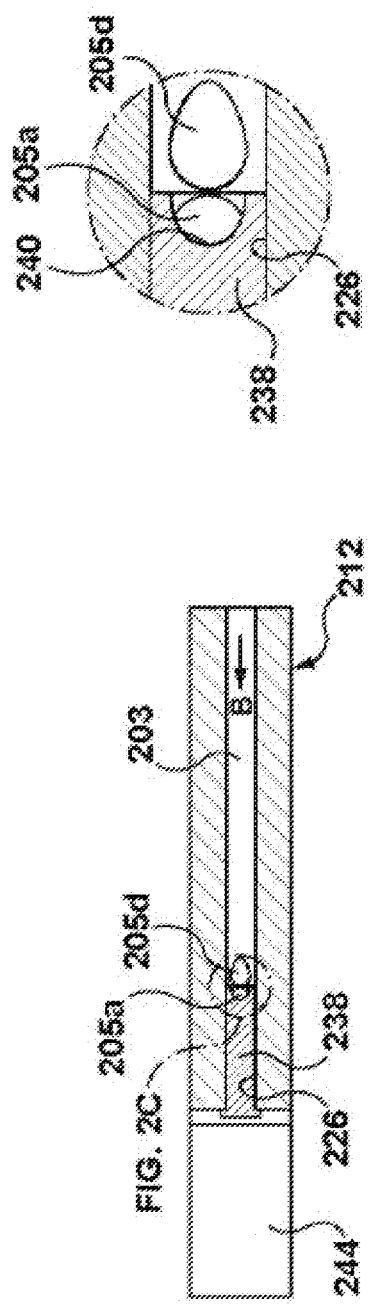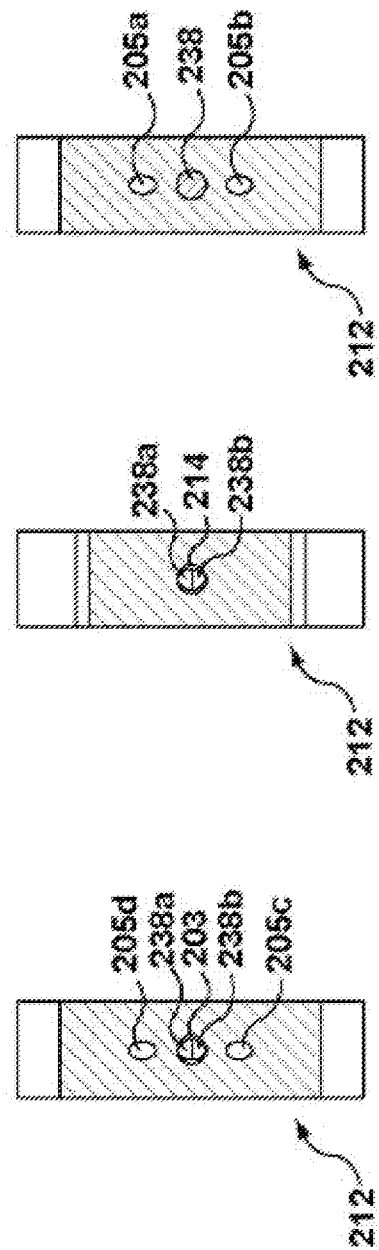

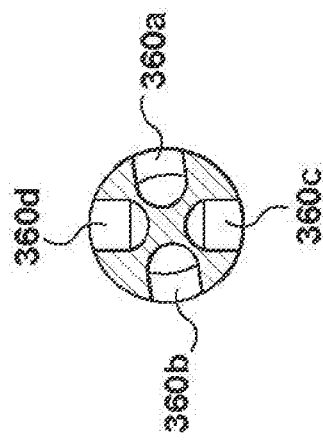
FIG. 4C
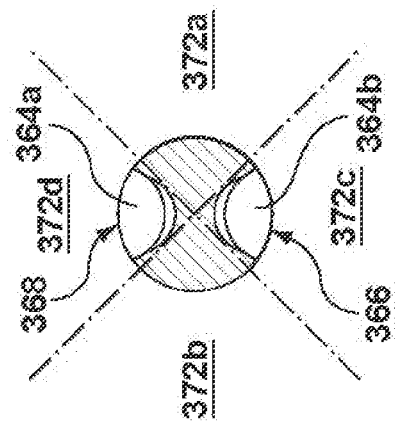
FIG. 4F
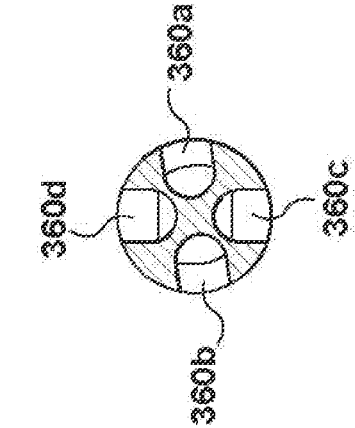
FIG. 4B
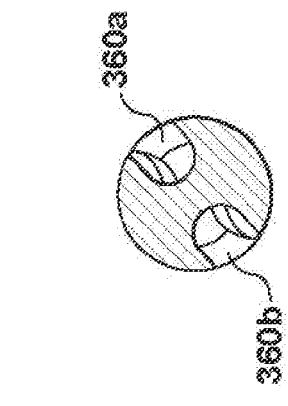
FIG. 4E
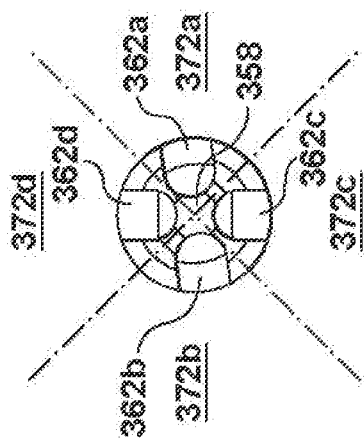
FIG. 4A
FIG. 4D

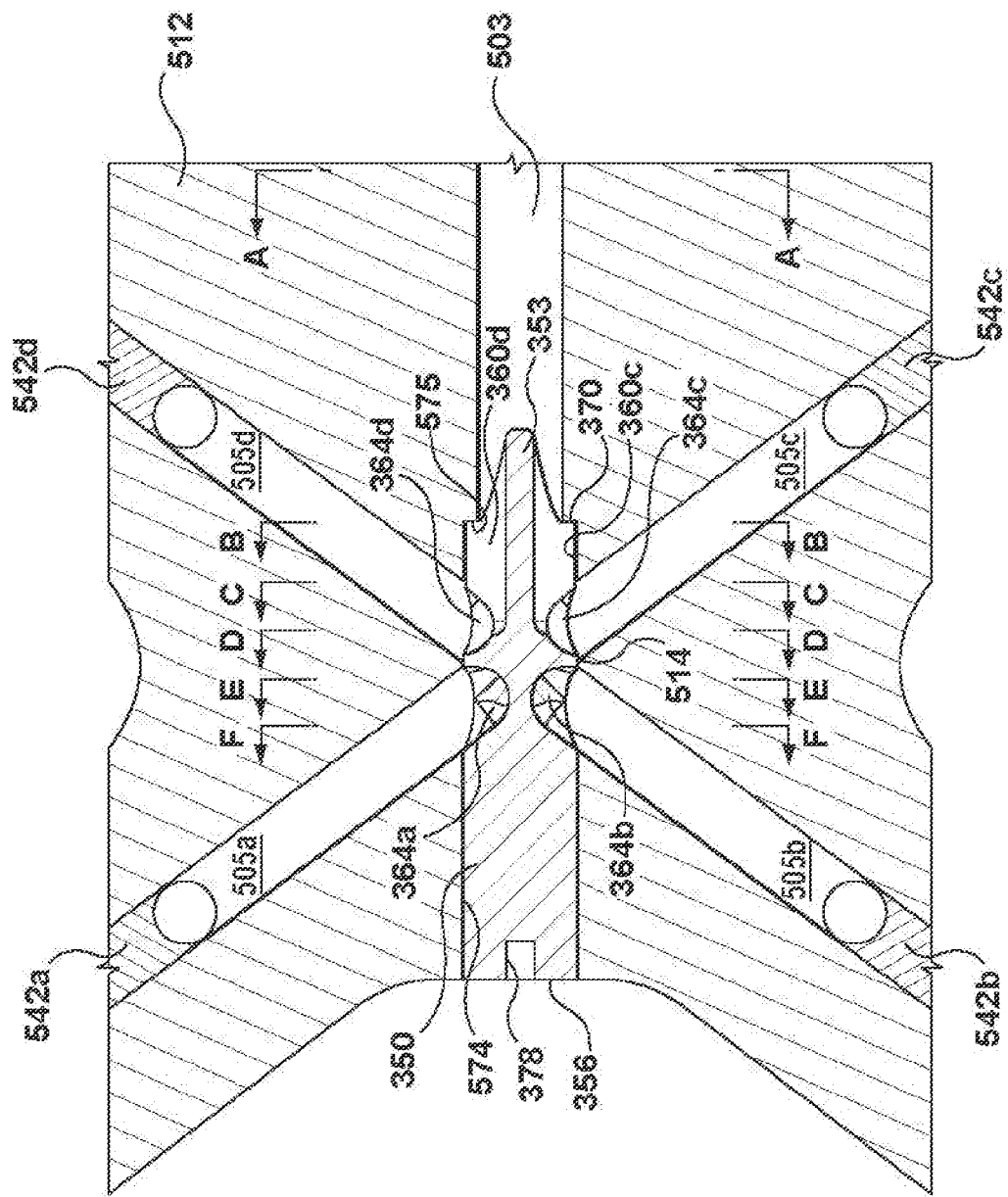

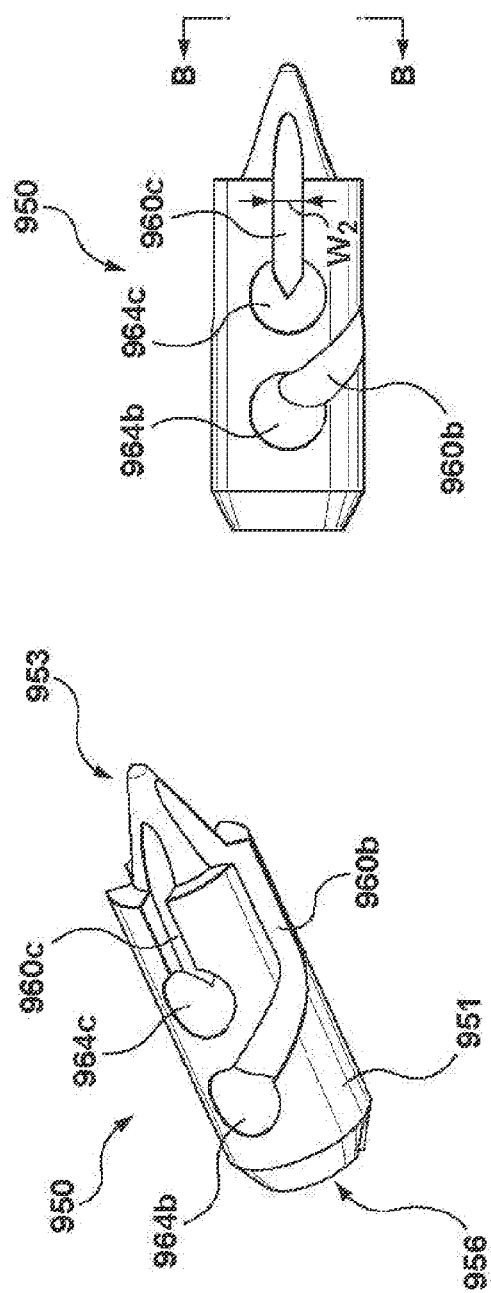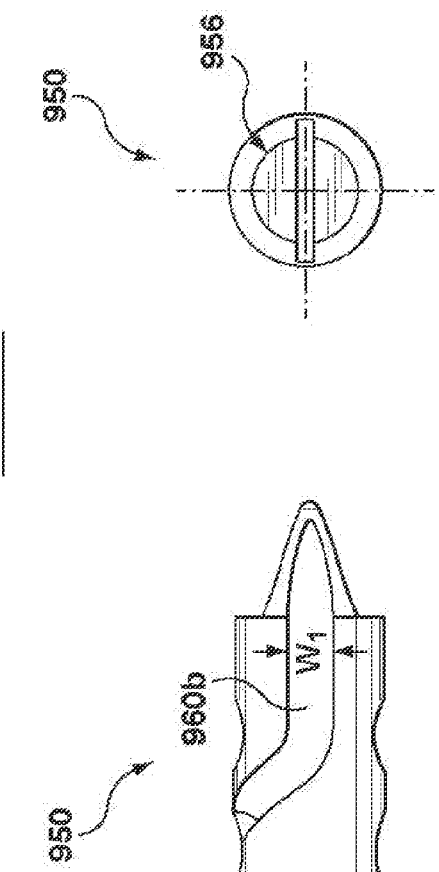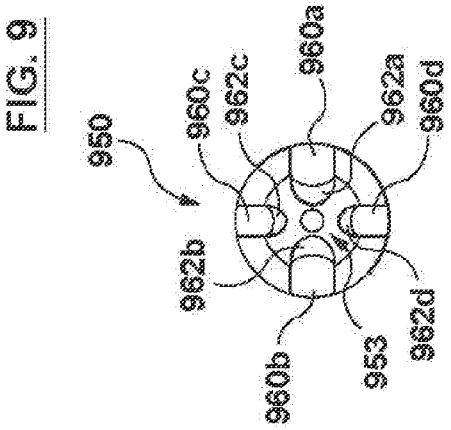

SINGLE LEVEL MANIFOLD FOR AN INJECTION MOLDING APPARATUS

FIELD OF THE INVENTION

The present invention relates generally to an injection molding apparatus and more particularly to a manifold for directing melt flow through the injection molding apparatus.

BACKGROUND OF THE INVENTION

The use of manifolds in injection molding systems to transfer a melt stream from a melt source to one or more nozzles for delivering melt to one or more mold cavities is well known. Furthermore, it is well known that in many injection molding applications it is important that the manifold melt channel layout, or runner system as it is known in the art, be provided such that each cavity receives a flow of melt having the same temperature and the same shear history. Such systems can be described as "balanced". Balancing of the manifold runner system is important in order to achieve a greater consistency, or homogeneity, of the melt stream as it is divided from a single melt stream at the manifold inlet to a plurality of manifold outlets which correspond with a plurality of mold cavities in a multi-cavity application. The result of balancing the melt stream is an overall increase in quality and uniformity of molded part being formed, when compared to parts formed in systems that are not balanced as such.

Conventional balancing of the melt stream includes designing the manifold to have geometrically matching runner layouts; that is: matching diameters, equal runner lengths, number of turns, and melt channel level changes in each melt path from the manifold inlet to a respective mold cavity. However, at times, despite having matched runner layouts, the melt stream may be different from cavity to cavity due to shear heating of the melt stream as it is forced along the melt path through the runners. More specifically, when the melt stream is forced under pressure through a bore, that is, a runner or manifold melt channel as is done in a hot runner manifold, the melt stream experiences shear in the area adjacent to the bore or melt channel wall with a corresponding localized elevation of the temperature. The result is a temperature differential across the bore or melt channel, with the center of the melt stream being cooler than the melt material closer to the bore or melt channel wall. This phenomenon is repeated at every split and/or turn of the melt stream along the melt path and may lead to an imbalance of shear-heated material between runners and subsequently between cavities of the injection molding apparatus.

Although a variety of devices and methods exist or have been proposed for addressing the need for balancing the melt delivered between cavities of a hot runner injection molding system, a need still exists for balancing or improving properties of a melt stream of moldable material flowing through a hot runner manifold so that each cavity of the system receives a relatively consistent or homogenous melt to thereby produce improved part to part consistency.

BRIEF SUMMARY OF THE INVENTION

Embodiments hereof are directed to an injection molding apparatus that includes a single level manifold having a melt splitter. The manifold receives a melt stream of moldable material from a melt source and directs the melt stream to outlets thereof. The manifold includes an upstream melt channel for directing the melt stream to a plurality of downstream melt channels, wherein the upstream melt channel and the plurality of downstream melt channels are in the same plane. A melt splitter is disposed within the manifold to be at least partially positioned within the upstream melt channel and is located where the upstream melt channel intersects with the plurality of downstream melt channels. The melt splitter has a plurality of flow paths that divide the melt stream received from the upstream melt channel into a plurality of substantially equal volumes and directs each of the substantially equal volumes of the melt stream into a respective one of the plurality of downstream melt channels.

In an embodiment, the melt splitter includes a number of flow paths equal to the number of downstream melt channels branching from the upstream melt channel. Each of the flow paths is a trough-like recess formed into an exterior surface of a body portion of the melt splitter with a path inlet and a path outlet. Each of the path inlets is fluidly connected with the upstream melt channel, and each of the path outlets is fluidly connected to one of the downstream melt channels. In another embodiment, the manifold may include two or more further downstream melt channels branching in the same plane from each of the downstream melt channels with a melt splitter having a number of flow paths equal to the number of further downstream melt channels positioned at the intersection thereof.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2B is a cross-sectional view of the manifold portion of FIG. 2A taken along line B-B.

FIG. 2C is an enlarged view of a portion of FIG. 2B.

FIG. 2D is a cross-sectional view of the manifold portion of FIG. 2A taken along line D-D.

FIG. 2E is a cross-sectional view of the manifold portion of FIG. 2A taken along line E-E.

FIG. 2F is a cross-sectional view of the manifold portion of FIG. 2A taken along line F-F.

FIG. 4A is an upstream end plan view of the melt splitter of FIGS. 3 and 4.

FIG. 4B is a cross-sectional view of the melt splitter of FIG. 4 taken along line B-B.

FIG. 4C is a cross-sectional view of the melt splitter of FIG. 4 taken along line C-C.

FIG. 4D is a cross-sectional view of the melt splitter of FIG. 4 taken along line D-D.

FIG. 4E is a cross-sectional view of the melt splitter of FIG. 4 taken along line E-E.

FIG. 4F is a cross-sectional view of the melt splitter of FIG. 4 taken along line F-F.

FIG. 5 is a sectional view of a portion of a manifold block of an injection molding apparatus in accordance with another embodiment hereof.

FIG. 9 a perspective side view of a melt splitter in accordance with another embodiment hereof.

FIGS. 9A and 9C are opposing side views of the melt splitter of FIG. 9.

FIG. 9B is a tip end view of the melt splitter of FIG. 9 in a direction of line B-B in FIG. 9A.

FIG. 9D is a plug end view of the melt splitter of FIG. 9 in a direction of line D-D in FIG. 9C.

DETAILED DESCRIPTION OF THE INVENTION

Specific embodiments of the present invention will now be described with reference to the figures, wherein like reference numbers indicate identical or functionally similar elements. The following detailed description is merely exemplary in nature and is not intended to limit the invention or the application and uses of the invention. Although the description of the invention is in the context of a hot runner injection molding manifold, embodiments thereof may also be used in any melt channel along the melt path from the melt source to the mold cavity where it is deemed useful. Furthermore, there is no intention to be bound by any expressed or implied theory presented in the preceding technical field, background, brief summary or the following detailed description. In the following description, "downstream" is used with reference to the direction of mold material flow from an inlet of the injection molding system to a mold cavity, and also to the order of components or features thereof through which the mold material flows from an inlet of the injection molding system to a mold cavity, whereas "upstream" is used with reference to the opposite direction.

Figure 1:
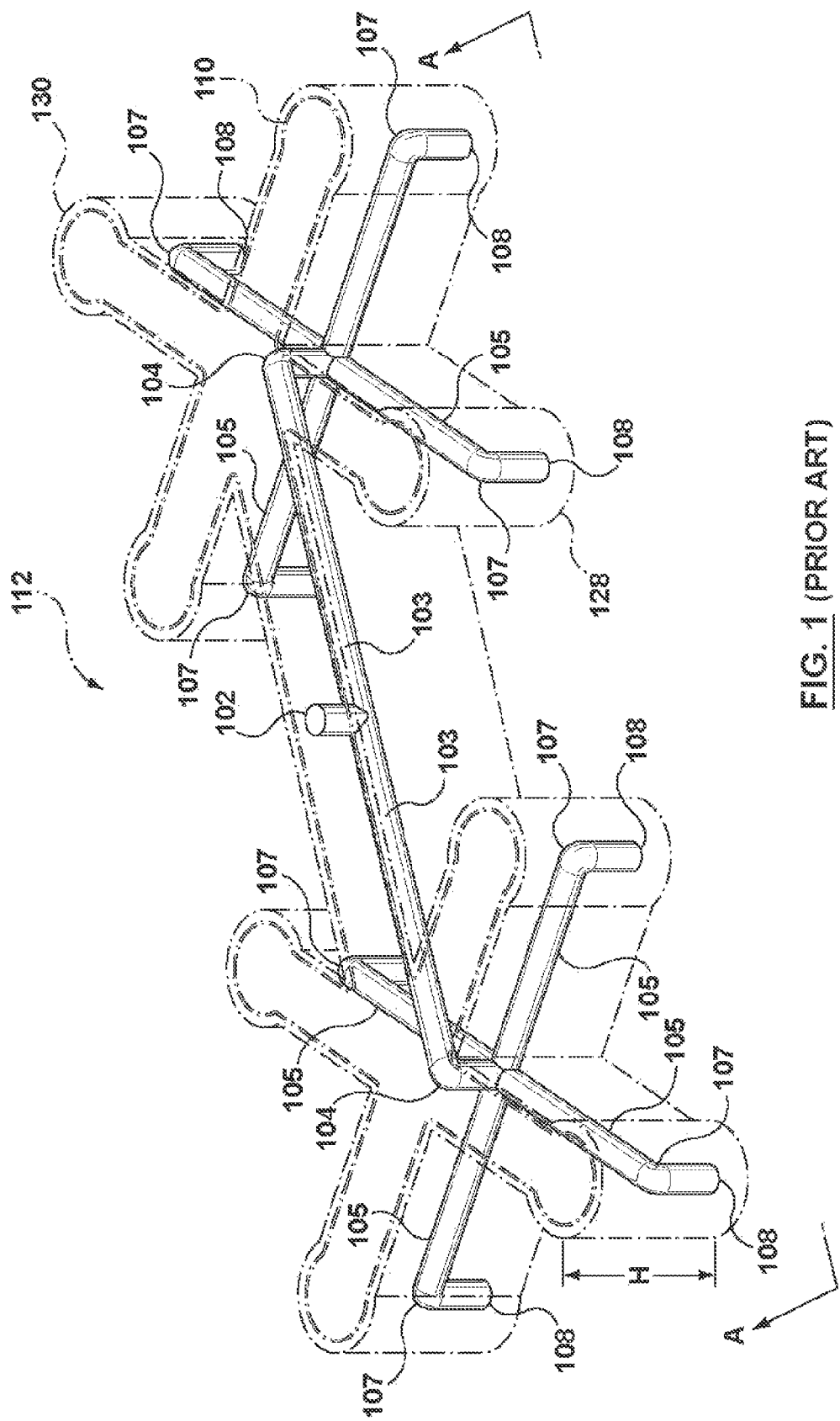
FIG. 1 is a perspective view of a conventional prior art two-level manifold.

FIG. 1 is a perspective view of a two level hot runner manifold 112 of a multi-cavity injection molding system. One of ordinary skill in the art will appreciate that the body of the manifold 112 is depicted with phantom lines for the purpose of illustrating the configuration of the melt channel within. A melt stream of moldable material enters manifold 112 along an inlet sprue channel 102. The melt stream is maintained at a moldable temperature by manifold heaters 110, also shown in phantom. The melt stream then divides and enters identical and opposite primary melt channels 103, and flows around a first approximately 90-degree turn or level change 104. The melt stream then divides again and enters identical and opposite secondary melt channels 105, which each include a second approximately 90-degree turn 107, and exits manifold 112 through outlets 108, respectively. Each outlet 108 is in fluid communication with the melt channel of a hot runner nozzle (not shown) to deliver the melt stream to a mold cavity of a mold (not shown). Manifold 112 may be described as a two-level manifold with a thickness H that includes a first set of primary runners 103 extending in a first plane and a second set of secondary runners 105 extending in a second plane, wherein the first and second planes are parallel to upstream and downstream surfaces 130, 128 of manifold 112.

Figure 2:
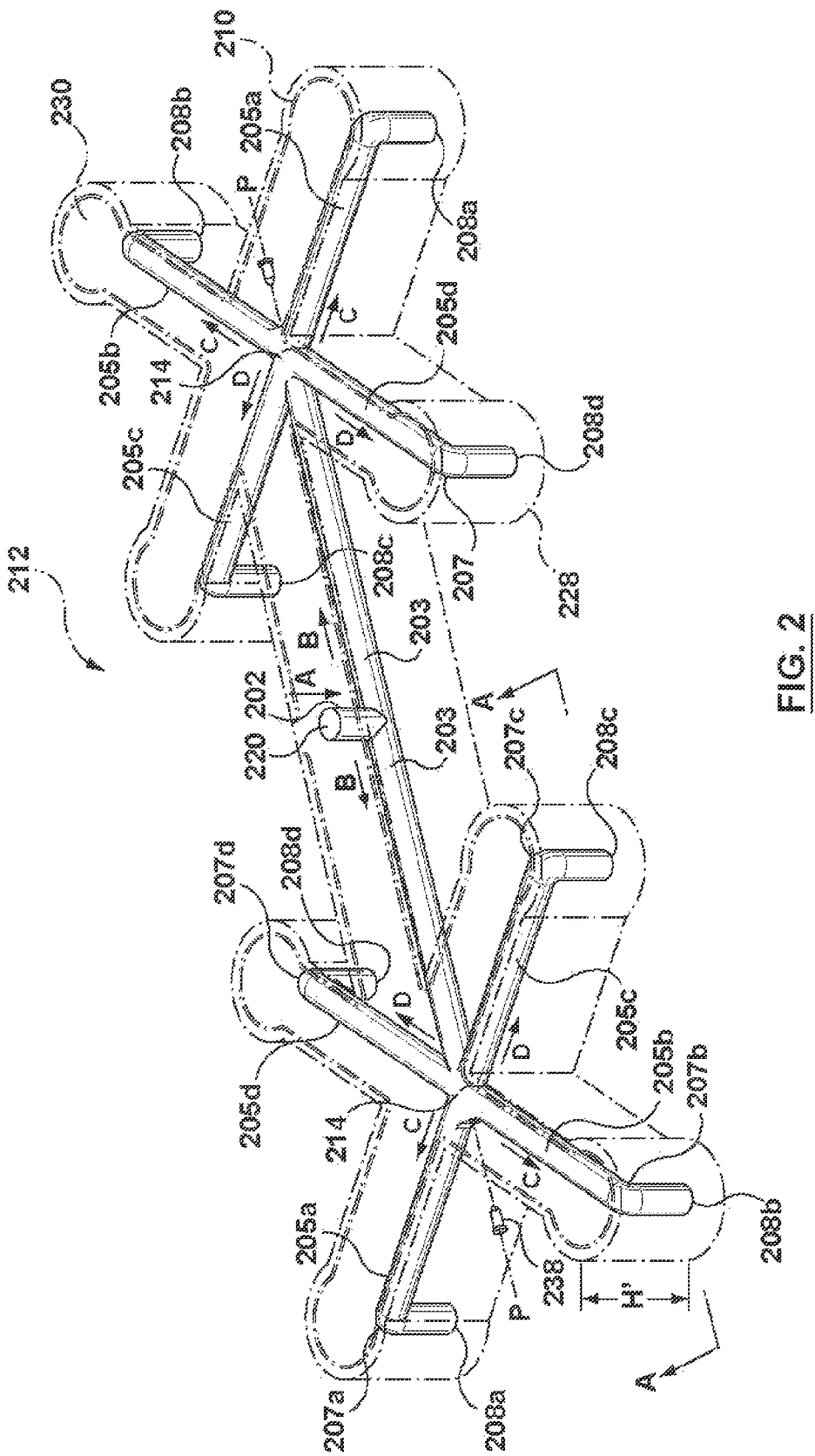
FIG. 2 is a perspective view of a manifold in accordance with an embodiment hereof.

FIGS. 2 and 2A-2F illustrate a manifold 212 for use in an injection molding apparatus in accordance with an embodiment hereof. One of ordinary skill in the art will appreciate that the body of the manifold 212 is depicted with phantom lines for the purpose of illustrating the configuration of the melt channels within. Manifold 212 defines an inlet channel 202 extending from an inlet 220 formed in an inlet or upstream surface 230 of manifold 212. Inlet channel 202 branches into two primary or upstream melt channels 203. A melt stream of moldable material introduced into inlet channel 202 generally flows in the direction of arrow A, while the melt stream within primary melt channels 203 generally flows in a direction of arrows B, which in the embodiment of FIG. 2 is substantially perpendicular to a direction of melt flow in inlet channel 202.

Figure 2A:
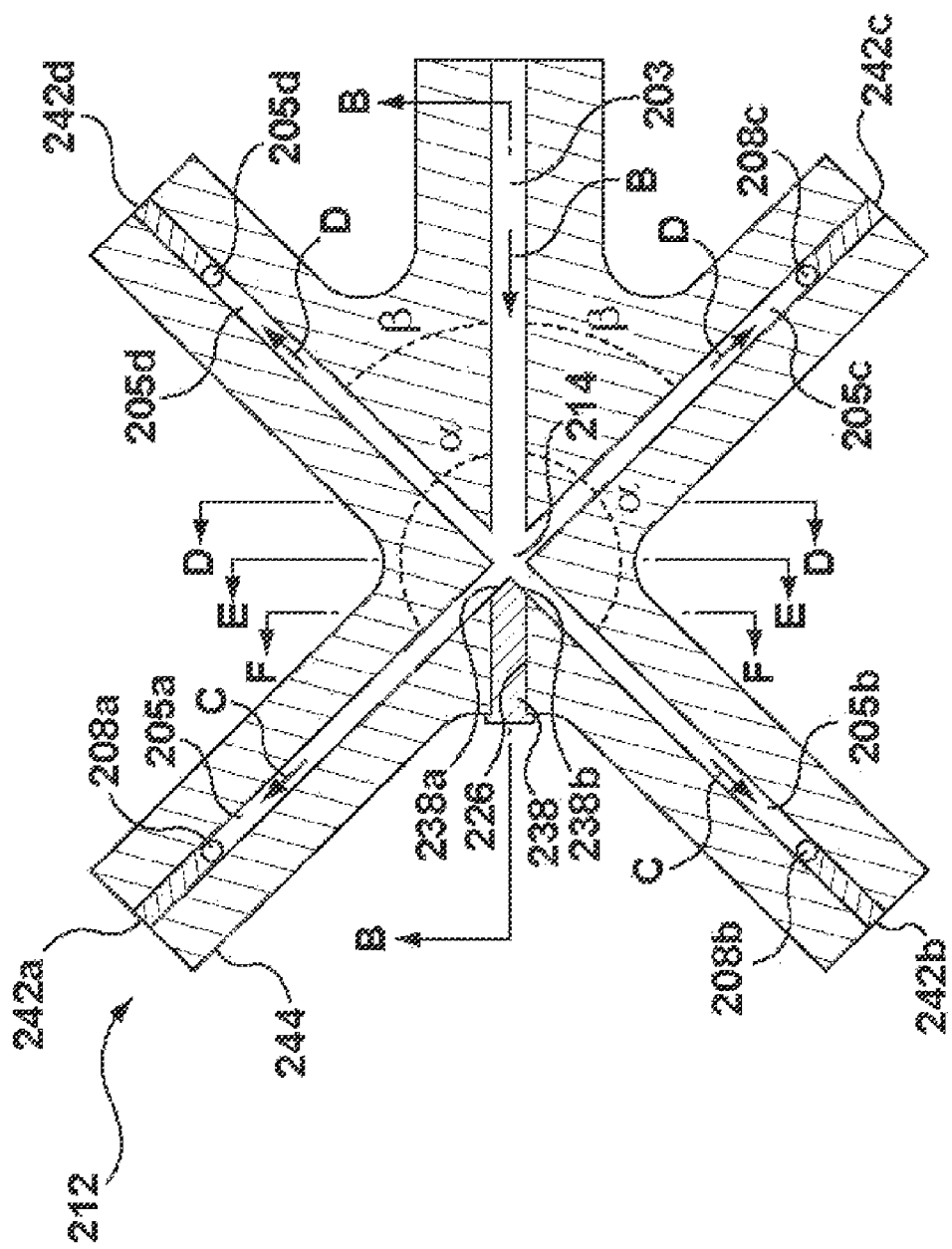
FIG. 2A is a cross-sectional view of a portion of the manifold of FIG. 2 taken along line A-A.

Unlike manifold 112 discussed above, manifold 212 does not include vertical drops, or level changes (denoted 104 in FIG. 1) for connecting primary melt channels 203 with secondary melt channels thereof, but rather each primary melt channel 203 splits or branches directly into secondary or downstream melt channels 205a, 205b, 205c and 205d at an intersection or hub 214, such that primary melt channel 203, secondary melt channels 205a, 205b, 205c, 205d, and hub 214 all exist on a common plane. As shown in FIG. 2A, which is a cross-sectional view of a left-side portion of manifold 212 through melt distribution plane P as depicted in FIG. 2, primary melt channel 203 provides melt flow into secondary melt channels 205a, 205b, 205c, 205d through hub 214, such that hub 214 and secondary melt channels 205a, 205b, 205c, 205d form a planar X-shaped intersection. In alternate embodiments hereof, various numbers and formations of secondary melt channels are contemplated as for example described below with reference to FIGS. 6-8. Melt distribution plane P may be described as being parallel to upstream surface 230 and downstream surface 228 of manifold 212 such that upstream surface 230 defines a first plane and downstream surface 228 defines a third plane with melt distribution plane P situated therebetween. Although melt distribution plane P is depicted equidistant from upstream surface 230 and downstream surface 228 in the current embodiment, in an alternative embodiment melt distribution plane could be offset towards either upstream surface 230 or downstream surface 228.

The melt stream in primary melt channel 203 generally flows downstream in the direction of arrow B, as shown in FIGS. 2, 2A and 2B. Secondary melt channels 205a, 205b extend generally in a direction such that secondary melt channels 205a, 205b form an obtuse angle α with primary melt channel 203. In secondary melt channels 205a, 205b, the direction of the melt stream is generally in the direction of arrows C, which is at least partially in the same direction as that of arrow B.

Secondary melt channels 205c, 205d extend generally in a direction such that secondary melt channels 205c, 205d form an acute angle β with primary melt channel 203. In secondary melt channels 205c, 205d, the direction of the melt stream is generally downstream in the direction of arrows D, which is at least partially in the opposite direction as that of arrow B.

A diverter plug 238 is positioned within a bore 226 that is defined within manifold 212 to partially define hub 214 and is positioned opposite of a downstream end of primary melt channel 203. Diverter plug 238 includes first and second beveled edges 238a, 238b to guide melt material exiting primary melt channel 203 into secondary melt channels 205a, 205b, respectively. As best illustrated in FIGS. 2A and 2C, each beveled edge 238a, 238b may define a cut-out 240, which defines a portion of an upstream end of secondary melt channels 205a and 205b. Cut-outs 240 are formed within diverter plug 238 in order to avoid sharp edges and/or dead spots within hub 214 so that the melt stream emanating from primary melt channel 203 flows smoothly and with a minimum of flow lines into secondary melt channels 205a, 205b.

As in manifold 112, heaters 210 are placed in manifold 212 to maintain the temperature of the manifold. An injection molding apparatus that utilizes manifold 212 may include, inter alia, additional components such as an inlet extension (not shown) fluidly connected to inlet 220 and nozzles (not shown) fluidly connected to each outlet 208. Each nozzle may include, inter alia, a nozzle heater, a nozzle tip, and other nozzle components as would be understood by one of ordinary skill in the art. The injection molding apparatus may also include a valve pin and actuator for valve-gated nozzles (not shown), thermocouples for monitoring the temperature at various locations throughout the injection molding apparatus (not shown) and providing feedback information to a power source (not shown), and other features that would be appreciated by one of ordinary skill in the art.

In FIG. 2 secondary melt channels 205a, 205b, 205c, 205d are shown to include respective turns or vertical drops 207a, 207b, 207c, 207d, such that respective outlets 208a, 208b, 208c, 208d are located in downstream surface 228 of manifold 212 that is opposite from upstream surface 230. Plugs 242a, 242b, 242c, 242d, as shown in FIG. 2A, are used to form turns or vertical drops 207a, 207b, 207c, 207d of about 90-degrees, as would be understood by one of ordinary skill in the art.

A single-level manifold 212 has a thickness H' defined by the distance between upstream surface 230 and downstream surface 228. Due to the additional material required in order to accommodate primary and secondary melt channels 103 and 105 respectively, as well as level changes 104, thickness H of manifold 112 in FIG. 1 is greater than thickness H' of the current embodiment. Such a single level arrangement of melt channels within manifold 212 simplifies the manufacture of manifold 212 since melt channels and intersections can be formed by drilling straight bores into the solid block of tool steel from which manifold 212 is formed, as well fewer plugs are required, which means less manufacturing steps and fewer areas for potential leakage. As such, only inlet channel 202 and outlets 208a, 208b, 208c and 208d are drilled in a plane other than the melt stream distribution plane of primary and secondary melt channels 203 and 205a-205d, which means manifold 212 is more economical to manufacture than a multi-level manifold. In addition, manifold 212 may be more energy efficient since the volume of steel required to manufacture manifold 212 is less than for a multi-level manifold meaning manifold 212 requires less power to heat. Manifold 212 will also result in the mold having a reduced stack height since the manifold plate can be thinner.

One of ordinary skill in the art will appreciate alternative embodiments of manifold 212 within the scope of the present invention. For example, inlet channel 202 may branch into more than two primary melt channels 203. In an embodiment, there is an even number of primary melt channels such that oppositely facing primary melt channels, as illustrated in FIG. 2, may be formed by the same bore in a manifold block further simplifying the manufacturing process. However, one of ordinary skill in the art can appreciate that each primary melt channel may be formed by a separate bore from an outside surface of the manifold block that intersects with a bore defining an inlet channel. In another embodiment, an odd number of primary melt channels may extend from an inlet channel. Similarly, although each primary melt channel 203 is further split into four secondary melt channels 205a-205d in FIGS. 2A-2F, one of ordinary skill in the art can appreciate that each primary melt channel may be split into fewer or more than four secondary melt channels arranged in the same plane as the primary melt channels.

Figure 3:
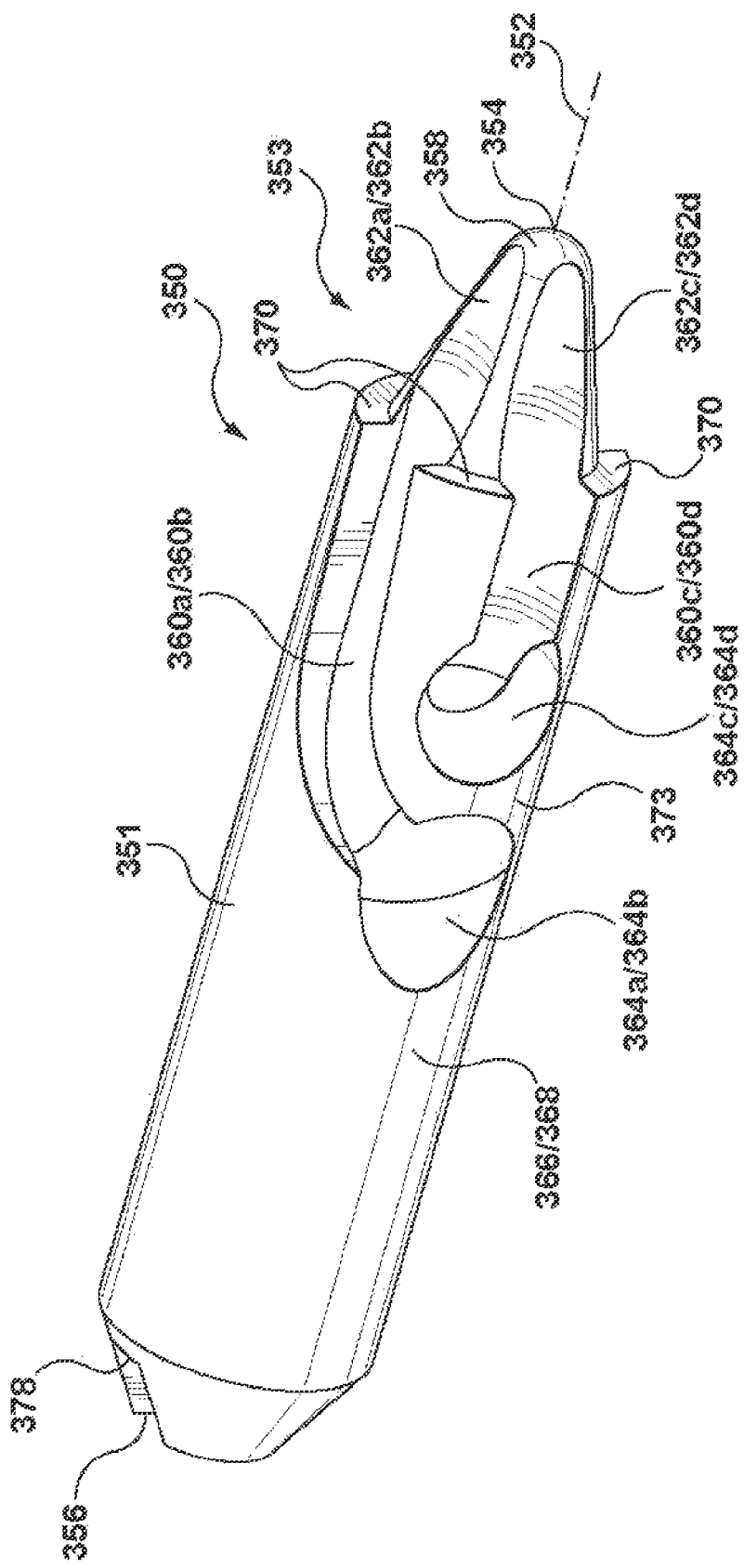
FIG. 3 is a perspective side view of a melt splitter in accordance with an embodiment hereof.

A melt splitter 350 in accordance with an embodiment hereof is shown in FIGS. 3, 4, and 4A-4F. Melt splitter 350 may be adapted for use in the embodiment shown in FIGS. 2 and 2A-2F to replace plug 238. Melt splitter 350 includes a generally cylindrical body 351 having a longitudinal axis 352, a generally conical tip 353, an inlet end 354 and a plug end 356, which is longitudinally opposite from inlet end 354. Conical tip 353 includes a rounded nose 358 around which melt material will easily flow. Four flow paths 360a, 360b, 360c, 360d, collectively referred to as flow paths 360, are trough-like recesses formed within an exterior or outer surface 373 of melt splitter 350 with three sides (side walls and bottom) defined by cylindrical body 351 and conical tip 353. In the embodiment of FIG. 3, flow paths 360a, 360b, 360c, 360d are of substantially equal widths with curved flow paths 360a, 360b being longer than straight flow paths 360c, 360d.

In another embodiment shown in FIGS. 9 and 9A-9D, melt splitter 950 includes a generally cylindrical body 951 having a generally conical tip 953 and a plug end 956, which is longitudinally opposite from tip 953. Melt splitter 950 includes flow paths 960a, 960b, 960c, 960d that have lengths as disclosed in the embodiment of FIG. 3. However the longer flow paths 960a, 960b of melt splitter 950 have a width $W_1$ that is greater than a width $W_2$ of the shorter flow paths 960c, 960d the result of which will increase melt flow in the longer curved flow paths 960a, 960b, and subsequently cause the melt to favor secondary melt channels 205a, 205b over secondary melt channels 205c, 205d. In another embodiment the width $W_2$ of the shorter flow paths 960c, 960d is greater then the width $W_1$ of the longer flow paths 960a, 960b of melt splitter 950 the result of which will increase melt flow in the shorter flow paths 960c, 960d and subsequently cause the melt to favor secondary melt channels 205c, 205d over secondary melt channels 205a, 205b. In yet another embodiment, width $W_1$ and width $W_2$ are sized so that the melt flowing through flow paths 960 may favor one or more flow paths and subsequently one or more of the secondary runners over the remaining flow paths and secondary runners. A melt splitter according to this type of embodiment would be suitable for balancing the fill time in applications with mold cavities of different sizes or shapes such as family molding applications.

Referring back to FIG. 3, flow paths 360 respectively have path inlets 362a, 362b, 362c, 362d, collectively referred to as path inlets 362, and path outlets 364a, 364b, 364c and 364d, collectively referred to as path outlets 364. In an embodiment, a path inlet 362 and a path outlet 364 may be a curved or sloped surface at the start and end of flow path 360, respectively, such as a surface formed by a ball nosed endmill in a multi axis machining operation. Path outlets 364 open to one of a first side 366 or a second side 368 of cylindrical body 351 of melt splitter 350, where second side 368 is disposed opposite from first side 366. One skilled in the art can appreciate that first side 366 is identical to second side 368, as such the side perspective view illustrated in FIG. 3 could be either first side 366 or second side 368. A shoulder 370 is provided where conical tip 353 abruptly transitions into cylindrical body 351. Similarly with reference to the embodiment of FIGS. 9 and 9A-9D, flow paths 960a, 960b, 960c, 960d have path inlets 962a, 962b, 962c, 962d and path outlets of which 964b, 964c are shown.

FIGS. 4 and 4A-4D illustrate how trough-like flow paths 360c, 360d are relatively straight from path inlets 362c, 362d to path outlets 364c, 364d, in a direction parallel to the longitudinal axis 352 of cylindrical body 351. FIGS. 4 and 4A-4F illustrate how trough-like flow paths 360a, 360b are curved counter-clockwise from first quadrants 372a, 372b to second quadrants 372d, 372c, respectively. Thus, path outlet 364a is aligned with path outlet 364d on side 368 of cylindrical body 351, and path outlet 364b is aligned with path outlet 364c on side 366 of cylindrical body 351. In an alternate embodiment, one of ordinary skill in the art can appreciate that flow paths 360a, 360b may be curved clockwise, such that path outlet 364a is aligned with path outlet 364c on side 366 of cylindrical body 351 and path outlet 364b is aligned with path outlet 364d on side 368 of cylindrical body 351. In another embodiment, each of flow paths 360 may be curved either clockwise or counter-clockwise as dictated by a particular desired positioning of path outlets 364 with respect to cylindrical body 351.

As illustrated in FIG. 3, trough-like flow paths 360 are provided on exterior surface 373 of cylindrical body 351 and conical tip 353. As such, melt splitter 350 can be formed by machining flow paths 360 on an exterior surface of a solid cylinder-shaped body. Alternatively, a melt splitter in accordance with embodiments hereof may be cast or otherwise formed into the desired shape such as by laser sintering or metal injection molding. In an embodiment, melt splitter 350 is made from a strong material such as tool steel and may be further heat treated to a required hardness. In an alternate embodiment, melt splitter 350 may be made from a highly thermally-conductive material such as copper or a copper alloy.

FIGS. 5 and 5A-5F illustrate melt splitter 350 positioned within a manifold 512 in accordance with an embodiment hereof. Manifold 512 is nearly identical to manifold 212 discussed above with respect to FIGS. 2 and 2A-2F, having primary or upstream melt channel 503 splitting into four secondary or downstream melt channels 505a, 505b, 505c, 505d on the same plane with plugs 542a, 542b, 542c, 542d for directing the melt stream to respective nozzles (not shown). Instead of having diverter plug 238, manifold 512 includes melt splitter 350. Melt splitter 350 is inserted in a recess 574 formed by a slightly larger bore than that used to form primary melt channel 503. As such, a shoulder 370 of melt splitter 350 sits against shoulder 575 of manifold 512, which is formed where recess 574 meets a downstream end of primary melt channel 503.

Figure 4:
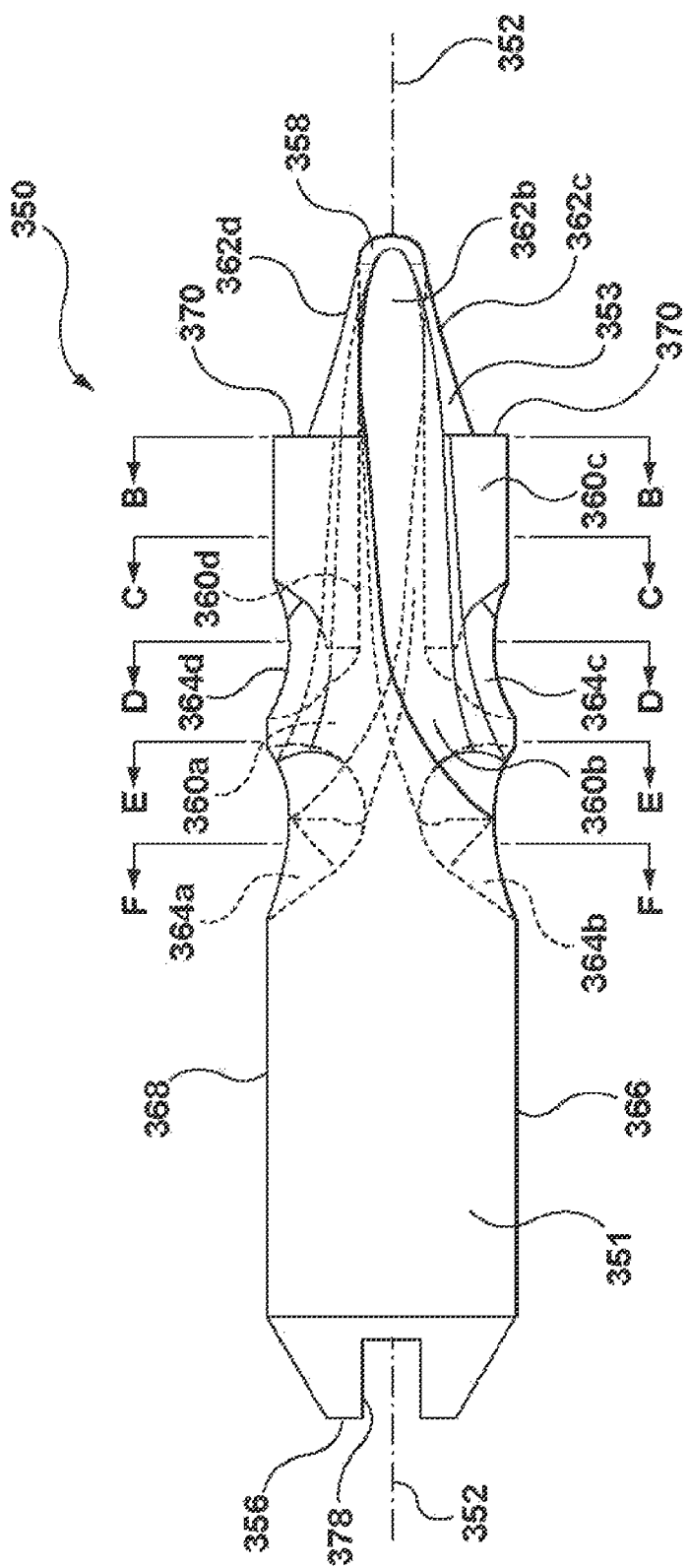
FIG. 4 is a side view of the melt splitter of FIG. 3.
Figure 5A:
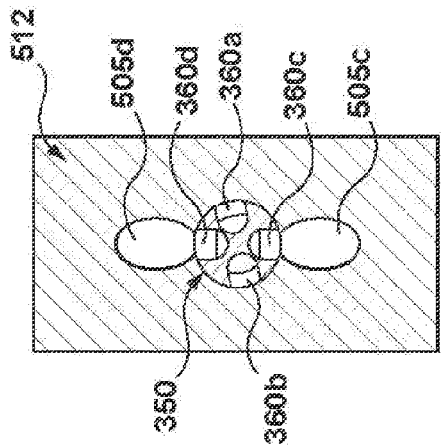
FIG. 5A is a cross-sectional view of the manifold block of FIG. 5 taken along line A-A.
Figure 5B:
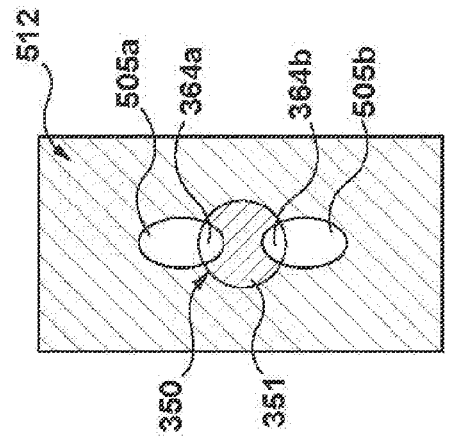
FIG. 5B is a cross-sectional view of the manifold block of FIG. 5 taken along line B-B.
Figure 5C:
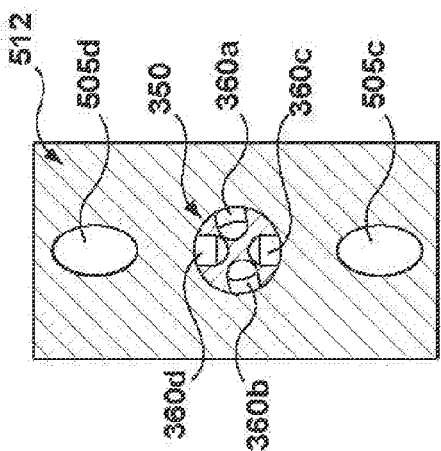
FIG. 5C is a cross-sectional view of the manifold block of FIG. 5 taken along line C-C.
Figure 5D:
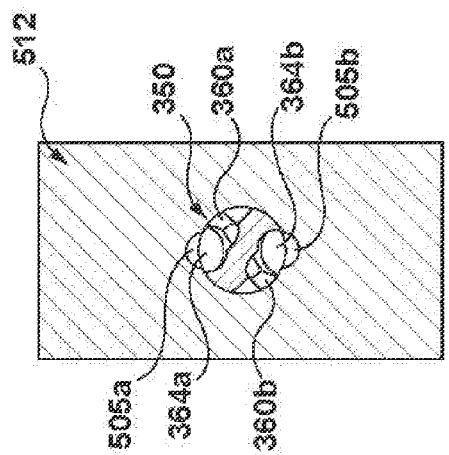
FIG. 5D is a cross-sectional view of the manifold block of FIG. 5 taken along line D-D.
Figure 5E:
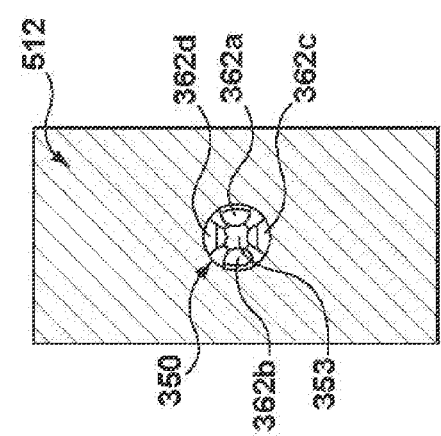
FIG. 5E is a cross-sectional view of the manifold block of FIG. 5 taken along line E-E.
Figure 5F:
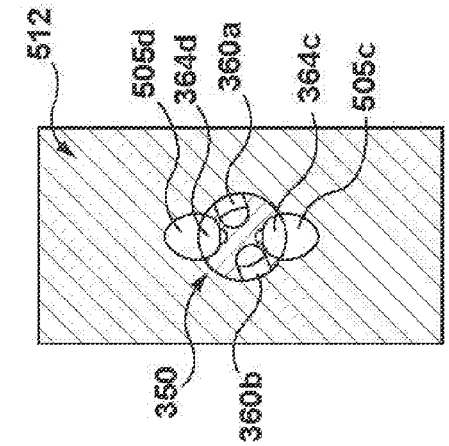
FIG. 5F is a cross-sectional view of the manifold block of FIG. 5 taken along line F-F.

As best seen in FIGS. 3 and 4, plug end 356 of melt splitter 350 has a generally frusto-conical shape and includes a slot 378 that receives a tool (not shown) for rotating melt splitter 350 in order to ensure that outlets 364 of flow paths 360 are aligned with respective secondary melt channels 505a, 505b 505c, 505d of manifold 512. In an embodiment, slot 378 may not be a slot as such, but instead be a threaded recess that accepts a socket-head cap screw or other tool (not shown) for installing into, and removing melt splitter 350 from recess 574 of manifold 512, for example, during manufacture, cleaning or maintenance of manifold 512. Slot 378 may be provided whether melt splitter 350 is permanently or removably installed in manifold 512. In another embodiment, plug end 356 of melt splitter 350 does not extend to the perimeter of the body of manifold 512, and is removably fastened within manifold 512 by a setscrew or other fastener (not shown) that engages with melt splitter 350 to create a seal between shoulder 370 of melt splitter 350 and shoulder 575 of manifold 512.

Referring back to FIG. 5, when melt splitter 350 is positioned within recess 574, the trough-like recesses that form flow paths 360 are capped/closed by the wall of recess 574 and/or the wall of primary melt channel 503. In this manner, a fluid conduit is formed between primary melt channel 503 and each of a respective secondary melt channels 505a, 505b, 505c, 505d with path outlets 364a, 364b, 364c, 364d of flow paths 360a, 360b, 360c, 360d being respectively aligned with secondary melt channels 505a, 505b, 505c, 505d. As such, melt material travelling downstream in primary melt channel 503 will split into four substantially equal parts upon contact with the melt splitter conical tip 353 and will flow along conduits defined by flow paths 360a, 360b, 360c, 360d and the manifold into respective secondary melt channels 505a, 505b, 505c, 505d. Splitting the melt into flow paths 360 prior to hub 514 ensures that substantially equal volumes of melt material are directed into each of flow paths 360 and subsequently directed respectively into each of secondary melt channels 505. Further, temperature and shear stress characteristics are substantially equalized among secondary melt channels 505 so as to achieve uniform molded products from nozzles (not shown) fluidly connected thereto.

FIGS. 5A-5F illustrate further how flow paths 360, from inlet 362 to outlet 364, of melt splitter 350 align with respective secondary melt channels 505a, 505b, 505c, 505d within manifold 512.

Melt splitter 350 may be positioned within recess 574 and permanently connected thereto by brazing, welding or another method. Melt splitter 350 forms a seal with manifold 512 to avoid leaking between manifold 512 and plug end 356 of melt splitter 350. If melt splitter 350 is brazed into manifold 512, melt splitter 350 will become integrally fastened to manifold 512, and as such would be "fused" wherever contact is made with the manifold. However, if melt splitter 350 is welded in place, weld in the area defined by frusto-conical plug end 356 of melt splitter 350 and recess 574 would not only integrally fasten melt splitter 350 to manifold 512, but also ensure a fluid seal between the melt splitter and the manifold. In an alternate embodiment, melt splitter 350 may be removably connected within manifold 512, and thermal expansion may cause melt splitter 350 and manifold 512 to expand and press tightly against one another such that melt material may not leak therebetween.

One of ordinary skill in the art will appreciate that a melt splitter may have flow paths, path inlets, and path outlets that are different in number and geometry depending upon the number, position and direction of flow of the secondary melt channels provided by a particular manifold block. For example, if a primary melt channel splits into five or more secondary melt channels, additional flow paths may be added to a melt splitter in accordance with an embodiment hereof to direct substantially equal volumes of melt material to each secondary melt channel. Similarly, if a primary melt channel splits into two or three secondary melt channels, the melt splitter may have fewer flow paths to align with the secondary melt channels respectively. In an embodiment shown in FIGS. 10 and 10A-10D, a melt splitter 1050 having three flow channels for splitting melt flow from a primary melt channel into three secondary melt channels is shown. Melt splitter 1050 includes a generally cylindrical body 1051 having a generally conical tip 1053 and a plug end 1056, which is longitudinally opposite from tip 1053. Melt splitter 1050 includes three flow paths 1060*a*, 1060*b*, 1060*c* with path inlets 1062*a*, 1062*b*, 1062*c* and path outlets of 1064*a*, 1064*b*, 1064*c* for directing melt flow from a primary melt channel to three secondary melt channels of the manifold.

Thus, various alternative embodiments of melt splitters are contemplated by the present invention, provided that the melt splitter splits melt material into substantially equal volumes and directs the melt material to particular downstream melt channels, as desired, based on particular arrangements of a manifold. Further a melt splitter in accordance with an embodiment hereof may be adapted to be positioned where an inlet channel of the manifold that splits into two or more primary melt channels that are in the same plane as the inlet channel.

Figure 6:
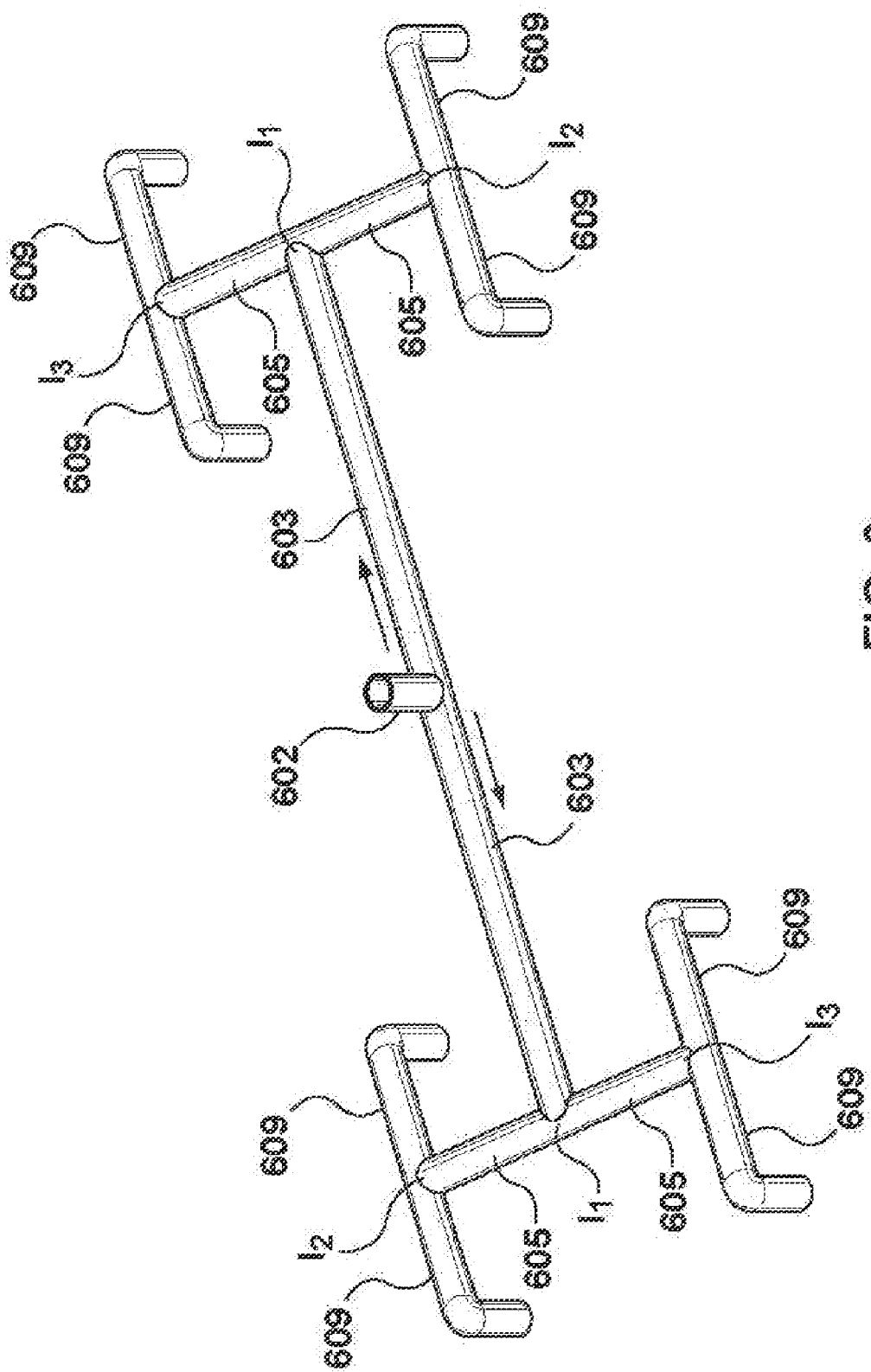
FIGS. 6, 7 and 8 are schematic representations of manifold melt channel arrangements in accordance with other embodiments hereof.

A single level manifold melt channel arrangement in accordance with another embodiment hereof is shown schematically in FIG. 6. Each primary or upstream melt channel 603 may be split into only two secondary melt channels 605 at intersections $I_1$, wherein the secondary or downstream melt channels 605 are positioned in the same plane as primary melt channel 603 and wherein the melt stream in the secondary melt channels 605 flows in a direction that is substantially perpendicular to the flow of the melt stream in the primary melt channel 603. In addition each secondary melt channel 605 may be split into two tertiary or further downstream melt channels 609 at intersections $I_2$ and $I_3$, wherein the tertiary melt channels 609 are positioned in the same plane as primary melt channels 603 and secondary melt channels 605 and wherein the melt stream in the tertiary melt channels 609 flows in a direction that is substantially perpendicular to the melt stream flow in the secondary melt channel 605. Melt splitters or diverter plugs in accordance with embodiments hereof may be used at one or more intersections $I_1$, $I_2$ and $I_3$.

Figure 7:
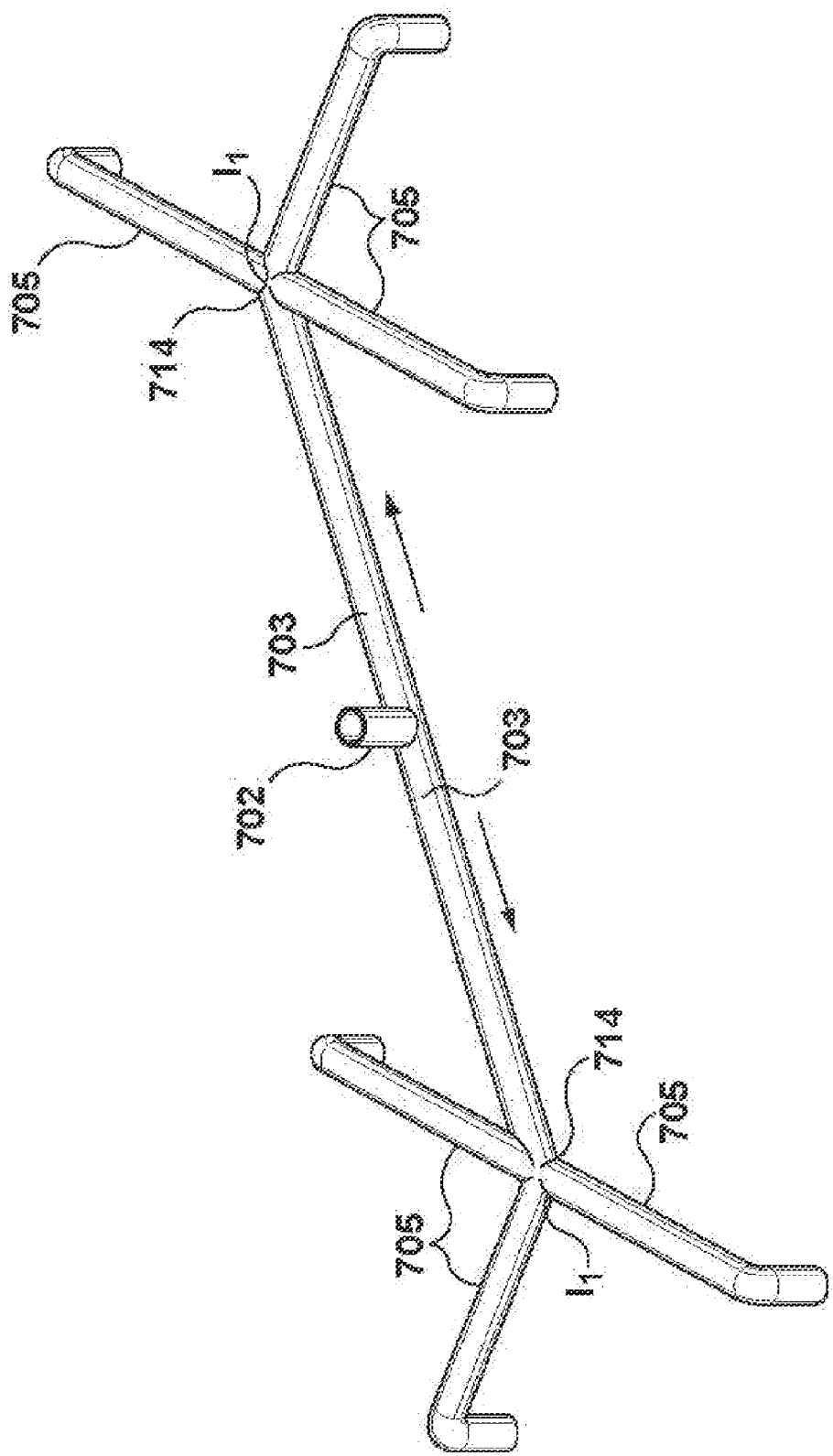

A single level manifold melt channel arrangement in accordance with another embodiment hereof is shown schematically in FIG. 7. Each upstream melt channel 703 is divided into three downstream melt channels 705 that extend from a hub 714, or intersection $I_1$, within the same plane as upstream melt channel 703. A melt splitter having three flow paths in accordance with embodiments hereof, such as melt splitter 1050 shown in FIG. 10, may be adapted for use at intersections $I_1$.

Figure 8:
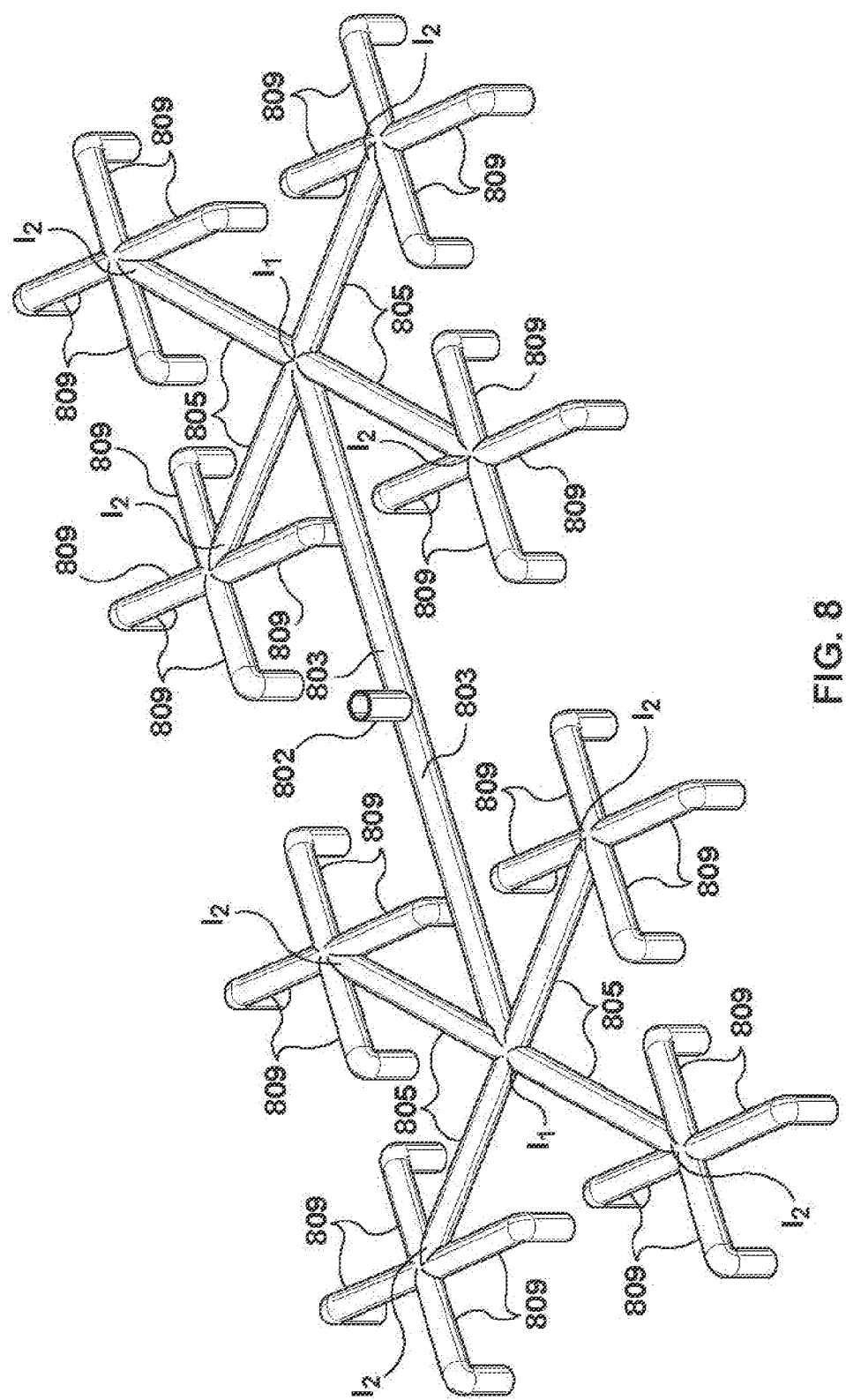
Figure 10A:
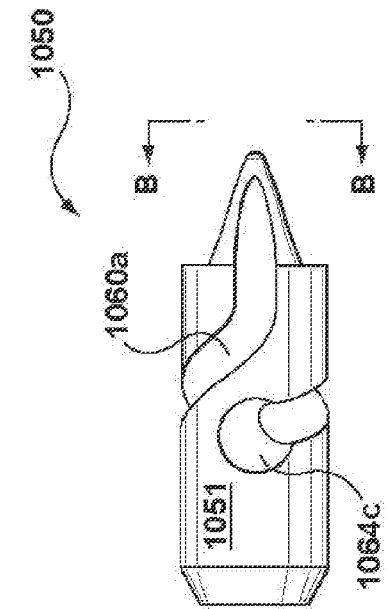
FIGS. 10A and 10C are opposing side views of the melt splitter of FIG. 10.
Figure 10:
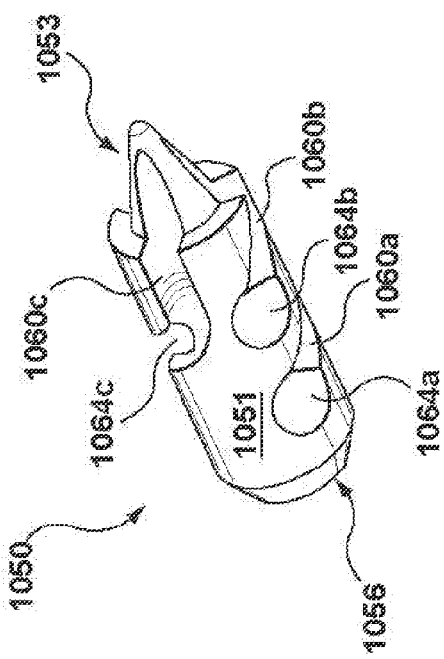
FIG. 10 a perspective side view of a melt splitter in accordance with another embodiment hereof.
Figure 10D:
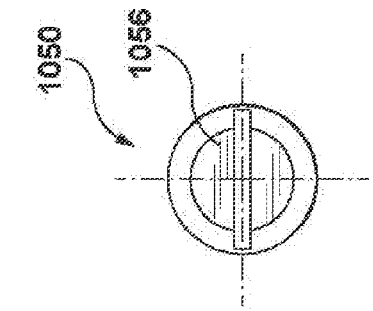
FIG. 10D is a plug end view of the melt splitter of FIG. 10 in a direction of line D-D in FIG. 10C.
Figure 10C:
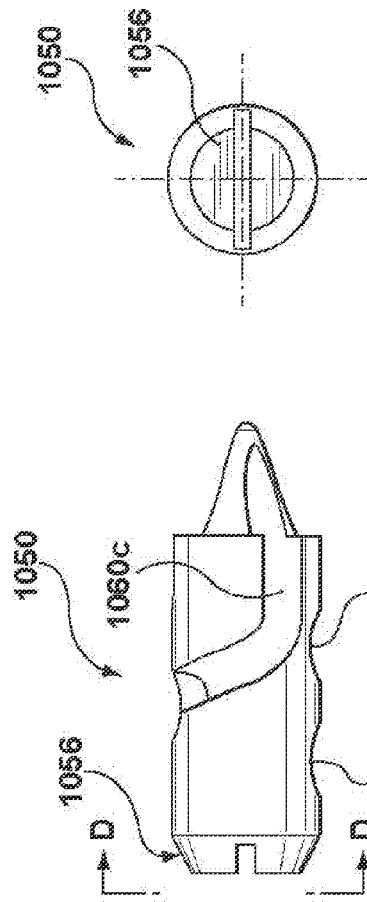
Figure 10B:
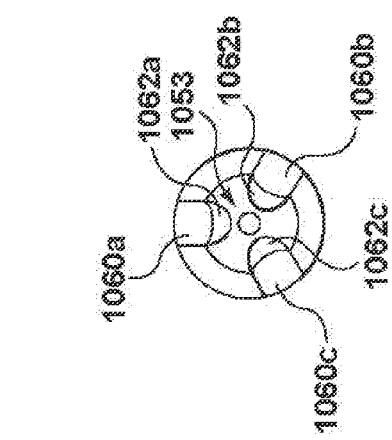
FIG. 10B is a tip end view of the melt splitter of FIG. 10 in a direction of line B-B in FIG. 10A.

A single level manifold melt channel arrangement in accordance with another embodiment hereof is shown schematically in FIG. 8. Each primary melt channel 803 is divided into four secondary melt channels 805 that extend from intersections $I_1$, within the same plane as primary melt channel 803. In addition each secondary melt channel 805 divides into four tertiary melt channels 809 at intersections $I_2$, wherein the tertiary melt channels 809 are positioned in the same plane as primary melt channels 803 and secondary melt channels 805. It would be understood by one of skill in the art that the secondary melt channels are upstream of the tertiary melt channels and the primary melt channels are upstream of the secondary melt channels. A melt splitter having four flow paths in accordance with embodiments hereof, such as melt splitter 350, may be adapted for use at intersections $I_1$ and/or $I_2$ to divide melt received from an upstream melt channel into the four downstream melt channels.

While various embodiments of the present invention have been described above, it should be understood that they have been presented by way of example only, and not limitation. It will be apparent to persons skilled in the relevant art that various changes in form and detail can be made therein without departing from the spirit and scope of the invention. It will also be understood that each feature of each embodiment discussed herein, and of each reference cited herein, can be used in combination with the features of any other embodiment. Thus, the breadth and scope of the present invention should not be limited by any of the above-described exemplary embodiments, but should be defined only in accordance with the following claims and their equivalents. All patents and publications discussed herein are incorporated by reference herein in their entirety.

What is claimed is:

1. A manifold for an injection molding apparatus, comprising:
   a manifold defining:
      an inlet, wherein the inlet is in a first plane;
      an inlet channel extending from the inlet and having a downstream end in a second plane;
      a plurality of primary melt channels extending from the downstream end of the inlet channel, wherein each of the plurality of primary melt channels extends in the second plane in a direction perpendicular to the inlet channel; and
      a plurality of secondary melt channels branching from a downstream end of at least one of the plurality of primary melt channels, wherein each of the plurality of secondary melt channels extends in the second plane; and
   a melt splitter positioned within the manifold, wherein the melt splitter includes a plurality of flow paths defined in an exterior surface of a body portion thereof, wherein each of the flow paths has a path inlet that is fluidly connected with the at least one of the plurality of primary melt channels and a path outlet that is fluidly connected to one of the plurality of secondary melt channels branching from the downstream end of the at least one of the plurality of primary melt channels.

2. The manifold of claim 1, wherein the at least one of the plurality of primary melt channels branches into four secondary melt channels such that the melt splitter has four flow paths.

3. The manifold of claim 2, wherein a first set of path outlets are aligned on a first side of the melt splitter to be in fluid communication with a first and second secondary melt channel and a second set of path outlets are aligned on a second side of the melt splitter, which is opposite from the first side of the melt splitter, to be in fluid communication with a third and fourth secondary melt channel.

4. The manifold of claim 2, wherein a first set of the flow paths is substantially straight with the path inlet and the path outlet aligned with a longitudinal axis of the melt splitter, and a second set of the flow paths curves around the melt splitter, such that the path inlet and the path outlet are not aligned with the longitudinal axis of the melt splitter.

5. The manifold of claim 1, wherein at least one of the plurality of secondary melt channels includes a bend of about 90-degrees, such that an outlet of the at least one of the plurality of secondary melt channels is in a third plane.

6. The manifold of claim 1, wherein the flow paths are recesses formed in the exterior surface of the melt splitter.

7. The manifold of claim 1, wherein the melt splitter is formed of tool steel.

8. The manifold of claim 1, wherein a width of at least one of the plurality of flow paths is greater than a width of one or more of the remaining flow paths so that a volume of melt flow through the at least one of the plurality of flow paths with the greater width is greater than a volume of melt flow through the one or more of the remaining flow paths.

9. The manifold of claim 1, wherein at least the path inlet portion of each of the flow paths is provided on an exterior surface of a conical tip at an inlet end of the body portion of the melt splitter.

10. An injection molding apparatus, comprising:
a manifold having a plurality of melt channels for receiving a melt stream of moldable material from a melt source and directing the melt stream to outlets of the manifold, the manifold having an upstream melt channel for directing the melt stream to a plurality of downstream melt channels, wherein the upstream melt channel and the plurality of downstream melt channels are in the same plane; and
a melt splitter disposed within the manifold to be at least partially positioned within the upstream melt channel and located where the upstream melt channel intersects with the plurality of downstream melt channels, wherein the melt splitter has a cylindrical body portion with a plurality of flow paths formed into an exterior surface thereof such that the plurality of flow paths divide the melt stream received from the upstream melt channel into a plurality of substantially equal volumes and direct each of the substantially equal volumes of the melt stream into a respective one of the plurality of downstream melt channels.

11. The injection molding apparatus of claim 10, wherein each of the flow paths is a recess with a path inlet and a path outlet such that when the melt splitter is positioned within the manifold, each of the path outlets aligns with a respective one of the downstream melt channels.

12. The injection molding apparatus of claim 11, wherein the upstream melt channel branches into four downstream melt channels and a first set of path outlets are aligned on a first side of the melt splitter to be in fluid communication with a first and second downstream melt channel and a second set of path outlets are aligned on a second side of the melt splitter, which is opposite from the first side of the melt splitter, to be in fluid communication with a third and fourth downstream melt channel.

13. The injection molding apparatus of claim 11, wherein a first set of the flow paths is substantially straight with the path inlet and the path outlet aligned with a longitudinal axis of the melt splitter, and a second set of the flow paths curves around the melt splitter, such that the path inlet and the path outlet are not aligned with the longitudinal axis of the melt splitter.

14. The injection molding apparatus of claim 10, wherein the melt splitter has a conical tip at an inlet end of the cylindrical body portion.

15. The injection molding apparatus of claim 14, wherein an upstream portion of each of the flow paths is provided on an exterior surface of the conical tip.

16. The injection molding apparatus of claim 10, wherein the melt splitter is inserted within a recess in the manifold that is a larger bore than a bore that forms the upstream melt channel.

17. The injection molding apparatus of claim 16, wherein a shoulder is formed in the manifold and the melt splitter includes a corresponding shoulder that sits against the shoulder of the manifold when the melt splitter is inserted within the recess.

18. The injection molding apparatus of claim 10, wherein the melt splitter is removably installed within the manifold.

19. The injection molding apparatus of claim 18, wherein thermal expansion of the melt splitter and manifold seals an interface therebetween.

20. The injection molding apparatus of claim 10, wherein the melt splitter is permanently installed within the manifold.

* * * * *